(12) United States Patent
Jordan

(10) Patent No.: US 9,547,583 B2
(45) Date of Patent: *Jan. 17, 2017

(54) AUTO-DEPLOYMENT AND TESTING OF SYSTEM APPLICATION TEST CASES IN REMOTE SERVER ENVIRONMENTS

(71) Applicant: INTERNATIONAL BUSINESS MACHINES CORPORATION, Armonk, NY (US)

(72) Inventor: Elias K. Jordan, Marrickville (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,740

(22) Filed: Mar. 16, 2016

(65) Prior Publication Data

US 2016/0179657 A1 Jun. 23, 2016

Related U.S. Application Data

(63) Continuation of application No. 14/492,153, filed on Sep. 22, 2014.

(51) Int. Cl.
*G06F 11/36* (2006.01)
*H04L 29/06* (2006.01)
(Continued)

(52) U.S. Cl.
CPC ....... *G06F 11/3664* (2013.01); *G06F 11/3684* (2013.01); *G06F 11/3688* (2013.01);
(Continued)

(58) Field of Classification Search
CPC .............. G06F 11/3688; G06F 11/3684; G06F 11/3692; G06F 11/3495
See application file for complete search history.

(56) References Cited

U.S. PATENT DOCUMENTS 7,373,632 B1 5/2008 Kawaguchi et al.
7,725,772 B2 5/2010 Proto
(Continued)

OTHER PUBLICATIONS

IBM et al., "A System and Method for Management of Remote Test Case Execution", ip.com, Oct. 12, 2007, IPCOM000159185D, pp. 1-4.

(Continued)

*Primary Examiner* — Jigar Patel
(74) *Attorney, Agent, or Firm* — Reza Sarbakhsh

(57) ABSTRACT

A method for executing a system application test case of a runtime system in an integrated server environment is provided. The method includes establishing a transmission control protocol connection between a client development environment and an integrated server environment, to initiate execution of the system application test case in the integrated server environment. The method further includes issuing a data transfer protocol transmission request to the integrated server environment for a description script of the system application test case. The method further includes transmitting an extensible markup language of the requested description script. The method further includes issuing a data transfer protocol transmission request to execute a test of the system application test case. The method further includes executing the system application test case in the integrated server environment. The method further includes transmitting the extensible markup language document of the compiled test results to the client development environment.

1 Claim, 5 Drawing Sheets

(51) Int. Cl.
H04L 12/24 (2006.01)
H04L 12/26 (2006.01)
(52) U.S. Cl.
CPC ...... *G06F 11/3692* (2013.01); *H04L 41/0266* (2013.01); *H04L 41/0803* (2013.01); *H04L 43/50* (2013.01); *H04L 67/42* (2013.01)

(56) References Cited

U.S. PATENT DOCUMENTS

| | | | |
|---|---|---|---|
| 7,954,088 | B2 | 5/2011 | Crawford |
| 8,001,532 | B1 | 8/2011 | Jakubiak et al. |
| 2006/0248405 | A1 | 11/2006 | Ponczak et al. |
| 2009/0055686 | A1* | 2/2009 | Tsang ................. G06F 11/3688 714/33 |
| 2009/0083578 | A1 | 3/2009 | Nan et al. |
| 2012/0089964 | A1 | 4/2012 | Sawano |
| 2014/0245070 | A1* | 8/2014 | Rumble ............. G06F 11/3692 714/38.14 |

OTHER PUBLICATIONS

Kupczynski, "Remote Debug Junit Tests Run from Ant", Geek Igor, http://igor.kupczynski.info/2013/08/08/remote-debug-junit-tests-run-from-ant.html, pp. 1-4, accessed on Sep. 10, 2014.
"Running a Junit test remotely, as if it were running locally, using Eclipse", stackoverflow, http://stackoverflow.com/questions/9894085/running-a-junit-test-remotely-as-if-it-were-running-locally-using-eclipse, pp. 1-2, accessed on Sep. 10, 2014.
Life in IDE, "Server-side unit testing from IDE", http://lifeinide.blogspot.in/2010/11/server-side-unit-testing-from-ide.html, accessed on Sep. 10, 2014, pp. 1-5, accessed on Sep. 10, 2014.
GITHUB, "Run JUnit tests remotely", https://github.com/Tradeshift/junit-remote, accessed on Sep. 10, 2014, pp. 1-3.
IBM: List of IBM Patents or Patent Applications Treated as Related (Appendix P), Jun. 24, 2016, pp. 1-2.
Jordan et al., Pending U.S. Appl. No. 14/492,153, filed Sep. 22, 2014, titled "Auto-Deployment and Testing of System Application Test Cases in Remote Server Environments," pp. 1-33.

\* cited by examiner

AUTO-DEPLOYMENT AND TESTING OF SYSTEM APPLICATION TEST CASES IN REMOTE SERVER ENVIRONMENTS

BACKGROUND

The present invention generally relates software system application, and more particularly to dynamic deployment of software application test cases, within an integrated system environment. In software development, it is often necessary to execute and examine a system application test case or code in an integrated environment, such as, for example, a Java application server. The integrated environment generally provides software and hardware resources, such as, database configuration resources, or application development resources, for examining the system application test cases. The integrated environment can also be a server development framework that provides a generalized approach for manually creating a client application-server implementation for executing and examining the system application test cases. For example, one function of the software developed framework can be based on manual execution of application procedures, such as, programs, routines, or scripts, for supporting processing of the examined software test cases in the integrated environment.

SUMMARY

Embodiments of the present invention disclose a computer-implemented method for executing a system application test case of a runtime system in an integrated server environment. A transmission control protocol connection between a client development environment and a integrated server environment is established, by an integrated server environment. The transmission connection is based on a request in the client development environment, to initiate the execution of the system application test case. The established transmission control protocol is performed in parallel between the client development environment and the integrated server environment. A data transfer protocol transmission request is issued by the integrated server environment. The request is issued to the integrated server environment for a description script of the system application test case wherein the data transfer protocol transmission request is Hypertext Transfer Protocol. An extensible markup language of the requested description script to the client development environment is transmitted, by the integrated server environment, via a server component of the integrated server environment. A data transfer protocol transmission request to execute the test of system application test case in the integrated server environment is issued, by the integrated server environment, based on the transmitted description script. The system application test case in the integrated server environment is executed, by the integrated server environment, wherein the server component compiles test results of the executed system application test case in an extensible markup language document. The extensible markup language document of the compiled test results to the client development environment for display is transmitted, by the integrated server environment, wherein the extensible markup language document comprising a plurality of logs identifying a system application test case condition.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
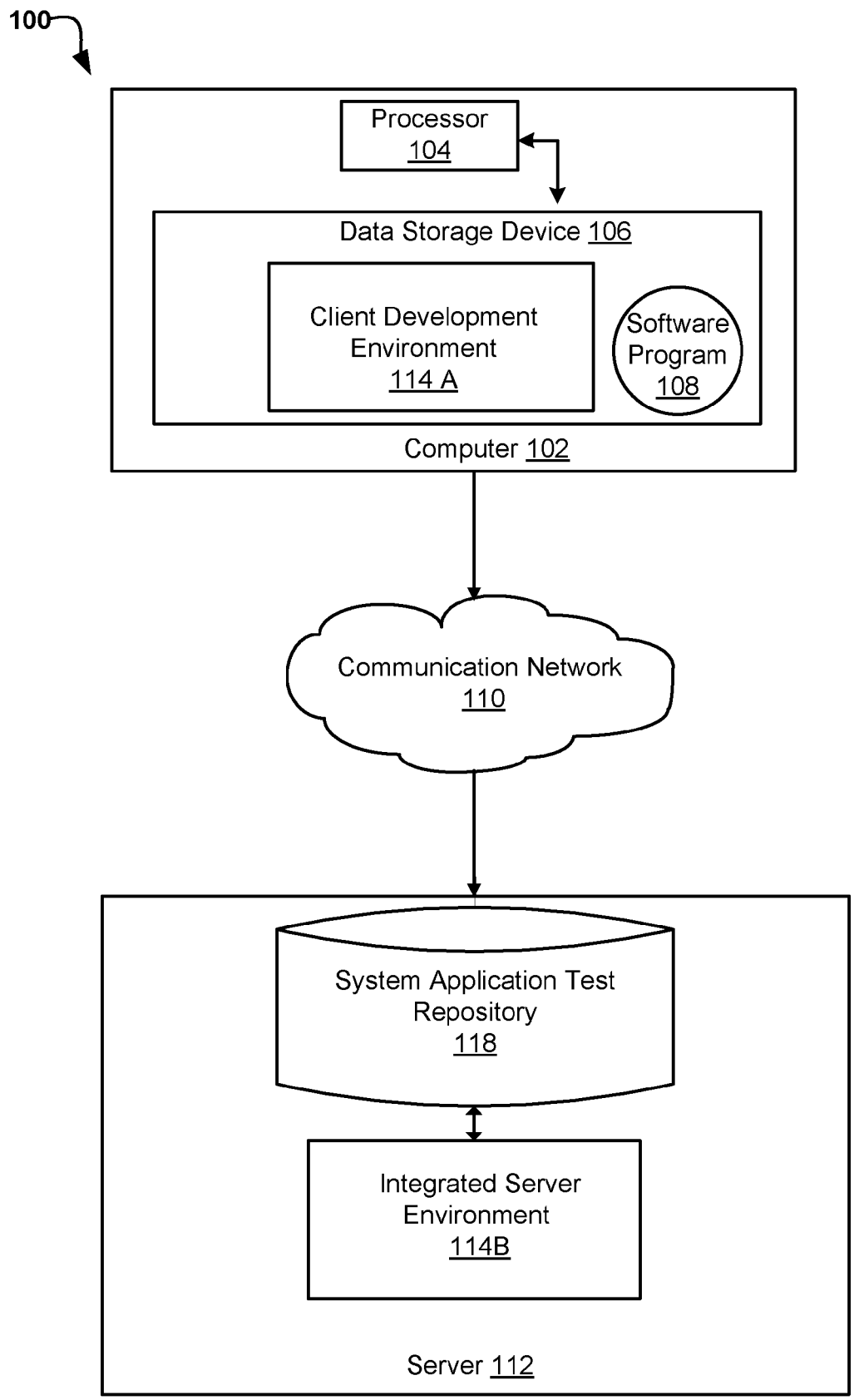
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In software engineering, a test case is a set of conditions or variables under which a tester, client, or system administrator of a computing system determines whether a software system application, or one or more features of the software system application, is operating, as it was originally configured to operate, or as it was originally programmed to execute program instructions. As such, a test case can provide important information to the client, or the systems administrator regarding operational quality of their software system application, or software product. For example, mechanisms can be implemented, or configured to determine whether the software system application passes or fails such a test. However, deployment and execution of such test cases are generally manually performed by the client, or the system administrator. As such, it may be advantageous, among other things, to provide a system to dynamically execute and examine software application test cases on a remote server and compile the software application test cases so the results may be used for further testing or evaluation.

Embodiment of the present invention generally relates to software system application, and more particularly to automatic deployment of software application test cases, between a client environment and a server environment. The embodiments include one or more circuits, or subassemblies of circuits, as well as, a system, or computer-implemented methods of operation for dynamically executing, and examining software application test cases, on a remote application server, of the server environment, whereby the software application test cases are subsequently compiled, as test results for further testing or evaluation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an integrated application test environment 100, for automatically deploying execution of integrated system application tests cases between a client development environment and a remote integrated server system environment, whereby the integrated server system environment compiles test results of the executed system application test cases in documents, such as, extensible markup language (XML) documents, for transmission of the compiled test results to the client development environment, all within the integrated application test environment 100, in accordance with at least one embodiment, is depicted.

For example, in the illustrated embodiment, the integrated application test environment 100 may include a computer 102 with a processor 104 and a data storage device 106 that is enabled to run, or execute program instructions of a software program 108. The computer 102 may also include a client development environment 114A, for managing an administrative computing interface, for performing system administrative functions of the compiled test results. The integrated application test environment 100 may also include a server 112, running an integrated server environment 114B, and interconnected with computer 102, over communication network 110, for automatically performing execution of integrated system application tests cases between the client development environment 114A and a remote of servlet application component of the integrated server environment 114B, instantly, without manual intervention, in accordance with embodiments.

The integrated application test environment 100 may also include a plurality of computers 102 and servers 112, only one of which is shown, at least in FIG. 1. The communication network 110 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

For example, the computer 102 may communicate with the integrated server environment 114B, running on server 112, via the communication network 110, for performing the execution of integrated system application tests cases, within the integrated application test environment 100. The communications network 110 may also include connections, such as wire, wireless communication links, or fiber optic cables. As will be discussed with reference to FIG. 5, server 112 may include internal components 800a and external components 900a, respectively, and computer 102 may include internal components 800b and external components 900b, respectively.

The computer 102 may be, for example, a laptop, tablet, or notebook personal computer (PC), a desktop computer, a mainframe or mini computer, or a personal digital assistant (PDA). The computer 102 can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing a network for performing the execution of integrated system application tests cases between the client development environment 114A and the integrated server environment 114B.

The database storage device 106 of computer 102 is any type of storage device, storage server, storage area network, redundant array of independent discs (RAID), cloud storage service, or any type of data storage. The database storage device 106 can also be a relational model database server for storing program instructions for displaying information pertaining to automatic deployment of executed integrated system application tests cases, in a computing interface of client development environment 100, for viewing by client, or systems administrator of client development environment 114A.

The server 112 can be, for example, a mainframe server computer system such as a management server, a web server, or any other electronic device or computing system capable of transmitting data, between server 112 and computer 102, for performing the automatic deployment of execution of integrated system application tests cases. The server 112 can also represent a "cloud" of computers interconnected by one or more networks, whereby, the server 112 is a primary server of a plurality of server computing systems that utilizes clustered computers, when accessed through the communication network 110. For example, a cloud computing system can be an implementation of automatic deployment of integrated system application tests cases, within the integrated application test environment 100.

The system application test case repository 118, of server 112, is any type of storage device, storage server, storage area network, redundant array of independent discs (RAID), cloud storage service, or any type of data storage for storing information relating to execution of integrated system application tests cases of sever 112. Similarly, the system application test case repository 118 can also be a relational model database server for storing program instructions for display information pertaining to automatic deployment of integrated system application tests cases within the integrated application test environment 100. For example, the relational model for database management of the system application test case repository 118 is based on first-order predicate logic. For example, in the relational model of a database, all data execution of integrated system application tests cases is represented in terms of tuples, grouped into relations.

For example, in the relational model of the system application test case repository 118, related records of the executed of integrated system application tests cases are linked together, based on a relative relationship of one or more system application test. Also, one function of the relational model of the system application test case repository 118 is to provide a declarative method for specifying data and queries of the system application test cases, whereby, users, clients, or systems administrators of the integrated application test environment 100 can directly state what information pertaining to the executed system application test cases is contained in the system application test case repository 118, and subsequently, what information they would like to retrieve from the system application test case repository 118.

As such, the integrated server environment 114B may provide a platform for implementing client retrieval mechanisms, for categorizing data structures, for storing data of the system application test cases, and also, retrieval procedures for answering queries, for retrieving the data, within the integrated application test environment 100.

Figure 2:
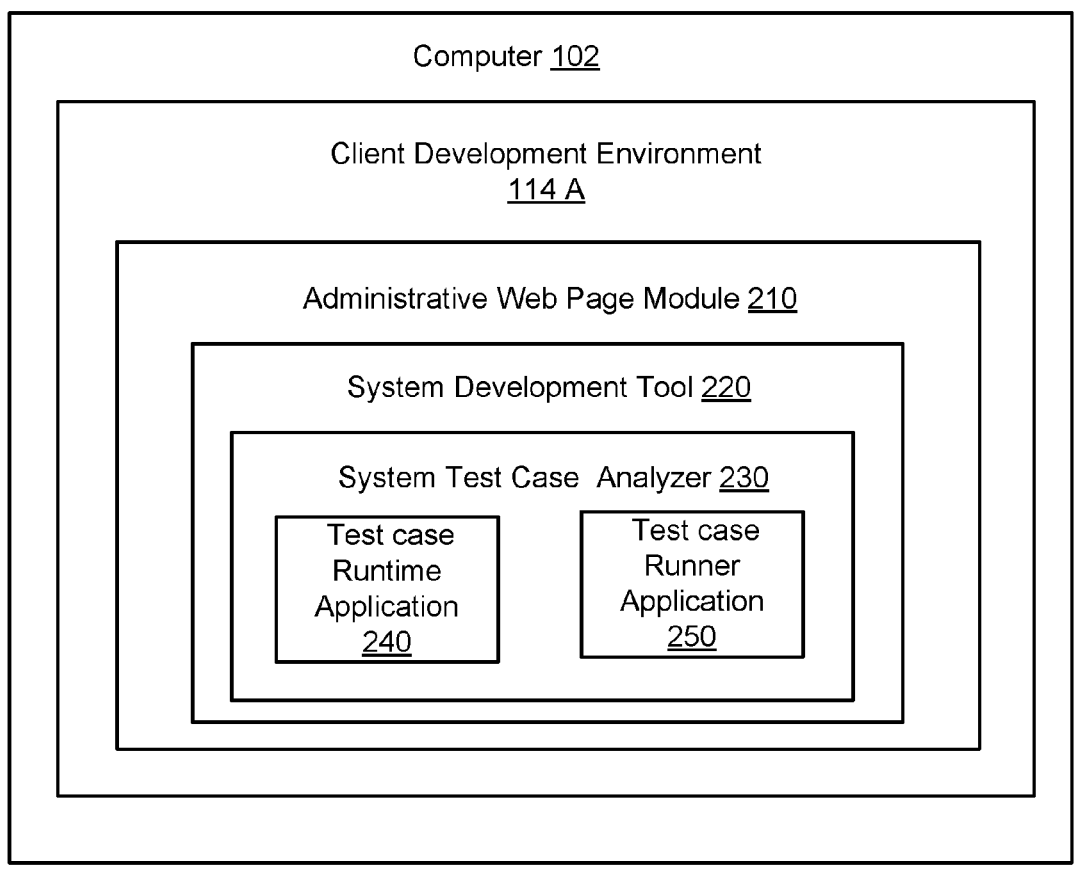
FIG. 2 illustrates the components and algorithms associated with a client development environment according to at least one embodiment.

Referring now to FIG. 2, a functional block diagram 200 illustrating program components and algorithms associated with the client development environment 114A, in accordance with embodiments.

Client development environment 114A can be a web browser plug-in system application program that provides an administrative user-interface for indentifying integrated system application test cases that are created, or modified by a systems administrator. The computing interface also provides functions for configuring automatic deployment of the identified integrated system application tests cases to the integrated server environment 114B, whereby, as described, the integrated system environment 114B compiles test results of the executed system application test cases, in an extensible markup language document (XML), for transmission of the compiled test results to the client development environment 114A.

The client development environment 114A may access system application test repository 118, running on server 112, for executing automatic deployment of the identified integrated system application test cases to the integrated server environment 114B. For example, the client development environment 114A may be centralized on the server 112, and also it may be divided between two different components: server-side and client-side. The server-side of integrated system environment 114B, running on server 112 may interact with the web browser of client development environment 114A, for transmission of the compiled test results to the client development environment 114A, via the interface of the web browsers of the client development environment 114A.

Client development environment 114A includes an administrative web page module 210. The administrative web page module 210 is a web browser plug-in/add-on that extends the functionality of client development environment 114A by adding additional user interface elements to the client development environment 114A for recording client, user, or system administrative actions in the additional user interface elements of client development environment 114A, during execution, and dynamic deployment of the identified integrated system application test cases between client development environment 114A and the integrated server environment 114B. Examples of web browsers include Internet Explorer® (Internet Explorer is a trademark of Microsoft Inc., in the United States, other countries or both), Firefox® (Firefox is a trademark of Mozilla Corporation, in the United States other countries, or both), Safari® (Safari is a trademark of Apple, Inc. in the United States, other countries, or both) and Google Chrome™ (Google Chrome is a trademark of Google, Inc. in the United States, other countries, or both), respectively.

Administrative web page module 210 can also be a deamon, a script, or a process. The administrative web page module 210 includes system development tool 220. System development tool 220 is a software test environment which may consist of a code editor, a compiler, a debugger, or a graphical user interface (GUI) builder, for providing an interface of an integrated development environment (IDE), which may include system application test case development features for automatically authoring, modifying, compiling or deploying system application test cases of client development environment 114A, and executing the system application test cases, for testing, within integrated server environment 114B.

System development tool 220 may be a standalone application, or may be included as part of one or more existing and compatible applications of computer 102, for performing the automatic deployment of the system application test cases, between the client development environment 114A and the integrated server environment 114B. The system development tool 220 can be executed or processed to be deployed, automatically, by a system to improve programming efficiency and productivity of system administrators, or application programmers, for evaluating results of the system application test cases, within integrated application test environment 100.

Examples of system development tool 220 may include, Eclipse™, IBM® Rational® Application Developer (RAD), Microsoft® .NET™ Visual Studio®, etc. (Eclipse is a trademark of the Eclipse Foundation in the United States and other countries; IBM and Rational are registered trademarks of International Business Machines Corporation in the United States, other countries, or both; Microsoft, Visual Studio, and .NET are registered trademarks or a trademark of Microsoft Corporation in the United States and other countries).

System development tool 220 includes system test case analyzer 230. System test case analyzer 230 identifies system application test cases in the client development environment 114A, based on a notification of an initiation to execute modified data files of the system application test cases, for executing test results of the modified data files in the integrated server environment 114B. For example, the system test case analyzer 230 automatically transmits the compiled test cases to the integrated server environment 114B, whereby the integrated server environment 114B categorizes system classes of the data files pertaining to the integrated server environment 114B, and triggers the integrated server environment 114B to reload the categorized system class for executing, examining, and automatically deploying the system application test cases.

The system test case analyzer 230 includes test case runtime application 240 and test case runner application 250. Test case runtime application 240 is an application unit testing framework that provides facility, or resources to client development environment 114A for managing performance execution of the system application test cases within integrated application test environment 100. Test case runtime application 240 may be, for example, a JUnit® (JUnit is a registered trademark of Tom Warhover in the United States, other countries, or both). For example, the JUnit® can be utilized by test case runner application 250 to dynamically create a set of unit tests, based on the system application test cases, whereby, the unit tests are automatically deployed to integrated server environment 114B, for executing the system application test cases, whereby, the integrated server environment 114B compiles test results of the executed system application test cases in an extensible markup language (XML) document, for transmittal and display in client development environment 114A, based on the configured unit tests.

The unit tests of JUnit® can also provide particular system testing frameworks and services, such as, hardware or software services of an application server, such as, Java EE® (Java EE® is a registered trademark of Oracle Corporation, in the United States, other countries, or both), which is adaptive to provide an application programming interface (API) and runtime environment for developing and running enterprise software of the executed test cases, including network and web services, and other large-scale, multi-tiered, scalable, reliable, and secure network applications, for executing the test cases within the integrated application test environment 100.

The system test case analyzer 230 can include a container of managed transactions of network services of software introspection of the identified integrated system application test cases, identified for execution between the runtime application 240 and test case runner application 250. The managed transactions can be utilized to issue a data transfer protocol transmission request for automatically transmitting a request to execute the system application test cases, in integrated server environment 114B, whereby, for instance, during any instance that the system application test case is built, and identified in client development environment 114A, the identified system application test case is automatically deployed to integrated server environment 114B, for testing.

Figure 3:
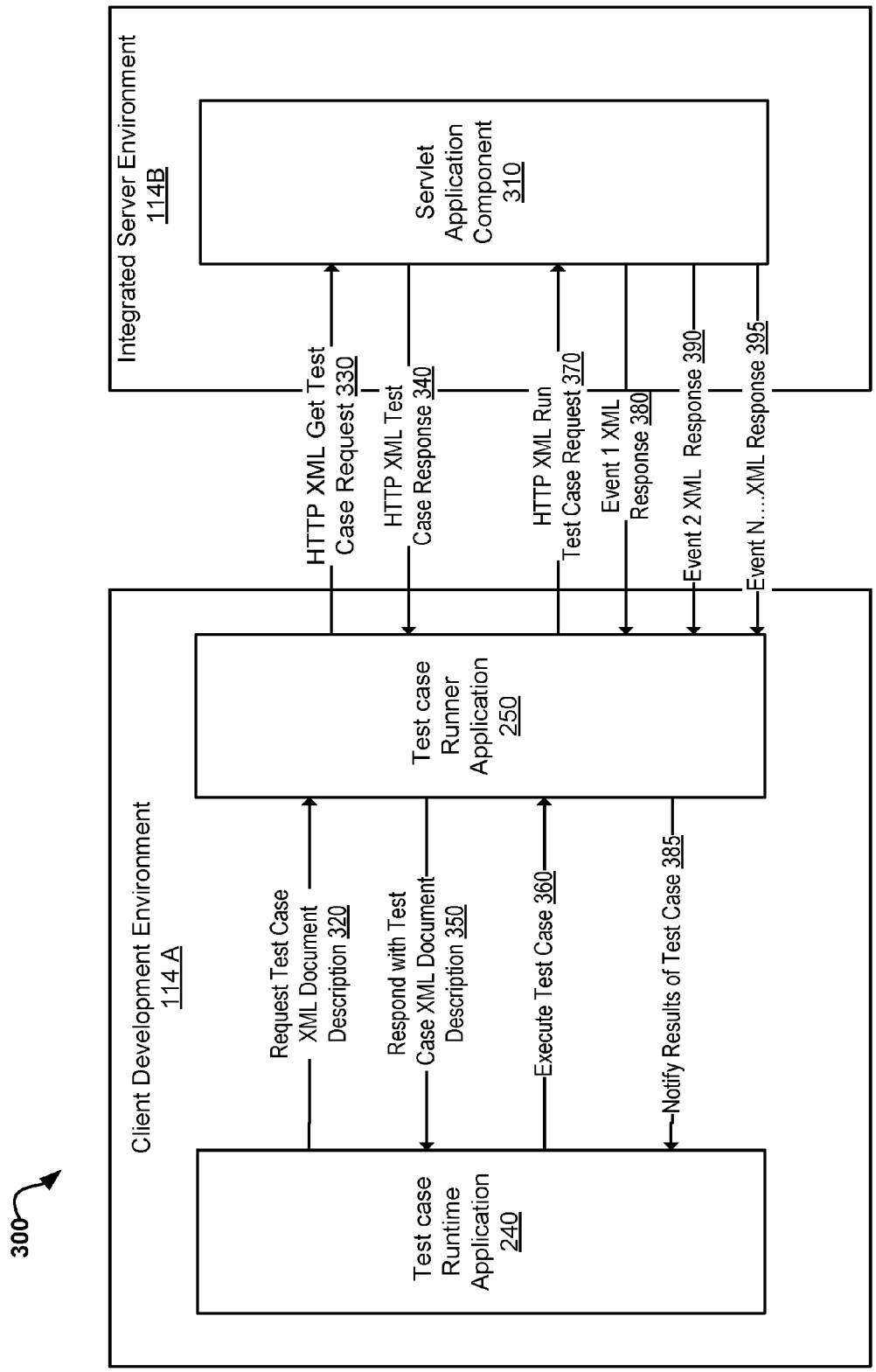
FIG. 3 is a network message flow diagram illustrating the steps carried out by a program to perform automatic deployment of the identified integrated system application tests according to at least one embodiment.

FIG. 3 is a network message flow diagram 300 illustrating transmission of communication for performing the automatic deployment of the identified integrated system application test, between client development environment 114A and integrated server environment 114B, according to embodiments.

Initially, a transmission control protocol (TCP) and internet protocol (IP) (TCP/IP) network connection may be established between client development environment 114A (FIG. 1) and integrated server environment 114B (FIG. 1), via the communication network 110 (FIG. 1), before commencement of the network message flow diagram 300. The TCP is the protocol utilized by Internet applications, such as, the World Wide Web, email, remote administration and file transfer of client development environment 114A (FIG. 1), for remotely connecting with applications, or systems of integrated server environment 114B (FIG. 1).

Also, the IP is responsible for maintaining a network connection between the client development environment 114A (FIG. 1) and the integrated server environment 114B (FIG. 1). IP is also responsible for routing the one or more packets of information for performing the automatic deployment of the identified integrated system application test from integrated server environment 114B (FIG. 1) to the client development environment 114A (FIG. 1), across integrated application test environment 100, in accordance with embodiments.

Once the TCP/IP connection is established, at message flow 320, the test case runtime application 240 (FIG. 2) sends a request for a document description of the system application test cases to the test runner application 250 (FIG. 2). For example, as previously described, the document can be in a XML description format, for providing software application introspection of the system development tool 220 (FIG. 2). Thereafter, at message flow 330, the test case runner application 250 (FIG. 2) subsequently sends a message request to the servlet application component 310 for a HyperText Markup Language (HTML) file of the document description of the system application test cases. For example, the servlet application component 310 is server plug-in/add-on that extends network capabilities of integrated server environment 114B (FIG. 1), for performing the automatic deployment of the identified integrated system application test cases. The servlet application component 310 can also be adaptive to respond, and transmit any type of networking requests over the communication network 110 (FIG. 1). The servlet application component 310 may be utilized by the integrated server environment 114B (FIG. 1) for generating content, such as, XML documents, for executing the system application test cases in integrated server environment (FIG. 1), whereby the servlet application component 310 compiles test results of the executed system application test cases.

At message flow 340, the servlet application component 310 transmits a response of the document description of the system application test cases to the test runner application 250 (FIG. 2), whereby, at message 350, the test case runner application 250 (FIG. 2) transmits the response of the document description of the system application test cases to the test runtime application 240 (FIG. 2). Thereafter, at message 360, the test runtime application 240 (FIG. 2) issues a data transfer protocol transmission request to test case runner application 250 (FIG. 2) for executing a test of system application test case in the integrated server environment 114B, based on the transmitted description script of the response at message flow 350.

Further, at message flow 370, the issued data transfer protocol transmission request is subsequently transmitted to the servlet application component 310, whereby, the servlet application component 310 executes the system application test case in the integrated server environment 114B (FIG. 1). For example, the servlet application component 310 compiles test results of the executed system application test case in an XML document format, for transmission of the results to the test runtime application 250 (FIG. 2). The servlet application component 310 compiles test results of the executed system application test cases for transmission of the results, consecutively, in the form of subsequent programming request events, such as, at message 380, event 1 XML response, at message 390 event 2 XML response, and subsequently, at message 395, event N . . . XML response, and so on. Also, at message flow 385, the test case runner application 250 (FIG. 2) subsequently provides notification of the results to the test case runtime application 240 (FIG. 2), for display of the results to the client development environment 114A.

Figure 4:
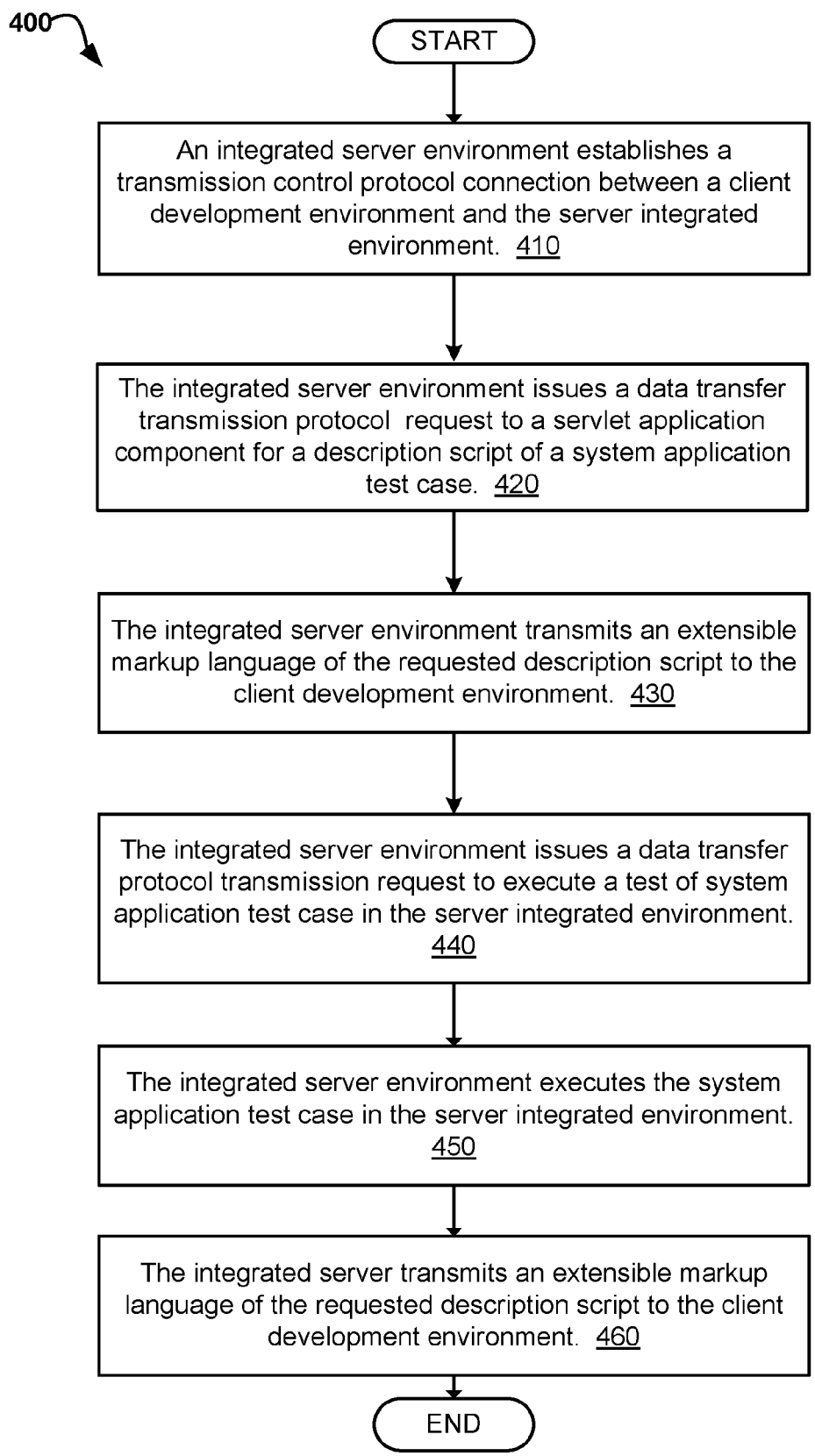
FIG. 4 is an operational flowchart illustrating the steps carried out by a program to perform automatic deployment of the identified integrated system application tests according to at least one embodiment.

FIG. 4 is a flow diagram 400 depicting steps performed by the integrated server environment 114B (FIG. 1) for performing the automatic deployment of the identified integrated system application test, in accordance with the embodiments.

As previously described, at step 410, the integrated server environment 114B (FIG. 1) establishes a TCP/IP connection, based on a request in client development environment (FIG. 1), to initiate execution of the system application test in integrated server environment 114B (FIG. 1). For example, a request-response model, between the client development environment 114A (FIG. 1) and the integrated server environment 114B (FIG. 1) is established and, subsequently, performed in parallel between the client development environment and the integrated server environment 114B (FIG. 1), for executing the system application test case. For example, client development environment 114A (FIG. 1) identifies the system application test case in the client development environment (FIG. 1), based on a notification of an initiation to execute modified data files of the system application test case, for executing test results of the modified data files in the integrated server environment 114B (FIG. 1).

For example, the client development environment (FIG. 1) further compiles the modified data files, based on the identification of system application test case. For example, the client development environment (FIG. 1) transmits the compiled test case to the integrated server environment 114B (FIG. 1), whereby the integrated server environment 114B (FIG. 1) categorizes system classes of the data files in the integrated server environment and triggers the integrated server environment to reload the categorized system class for executing system application test cases in the in the integrated server environment 114B (FIG. 1).

Thereafter, at step 420, integrated server environment 114B (FIG. 1) issues the HTTP connection request transmission request, within the integrated server environment 114B (FIG. 1) for a document description script of the system application test case. Further, at step 430, the integrated server environment 114B (FIG. 1) transmits the document description script to the client development environment, via the servlet application component 310 (FIG. 3) of the integrated server environment 114B (FIG. 1). Also, at step 430, the integrated server environment 114B (FIG. 1)

issues a data transfer protocol transmission request to execute a test of system application test case in the integrated server environment 114B (FIG. 1), based on the transmitted description script. For example, at step 440, the integrated server environment 114B (FIG. 1) issues a data transfer protocol transmission request to execute a test of system application test case in the integrated server environment 114B (FIG. 1). Further, at step 450, the integrated server environment 114B (FIG. 1) executes the system application test case within integrated server environment 114B (FIG. 1), based on the request, whereby, the servlet application component 310 (FIG. 3) compiles test results of the executed system application test case in a document script, such as, XML document that describes the executed system application test case.

Finally, at step 460, the integrated server environment 114B (FIG. 1) transmits the extensible markup language document of the compiled test results to the client development environment (FIG. 1), for display of test results of the system application test case, in accordance with embodiments. For example, the extensible markup language document of the compiled test results includes a plurality of events that occur during execution of the system application test case in the integrated server environment 114B (FIG. 1). For example the plurality of events identify whether the execution the system application test case was initiated, passed, or failed, automatic deployment and testing of the test results between integrated server environment 114B (FIG. 1) and client integrated environment 114B (FIG. 1), in accordance with embodiments.

Figure 5:
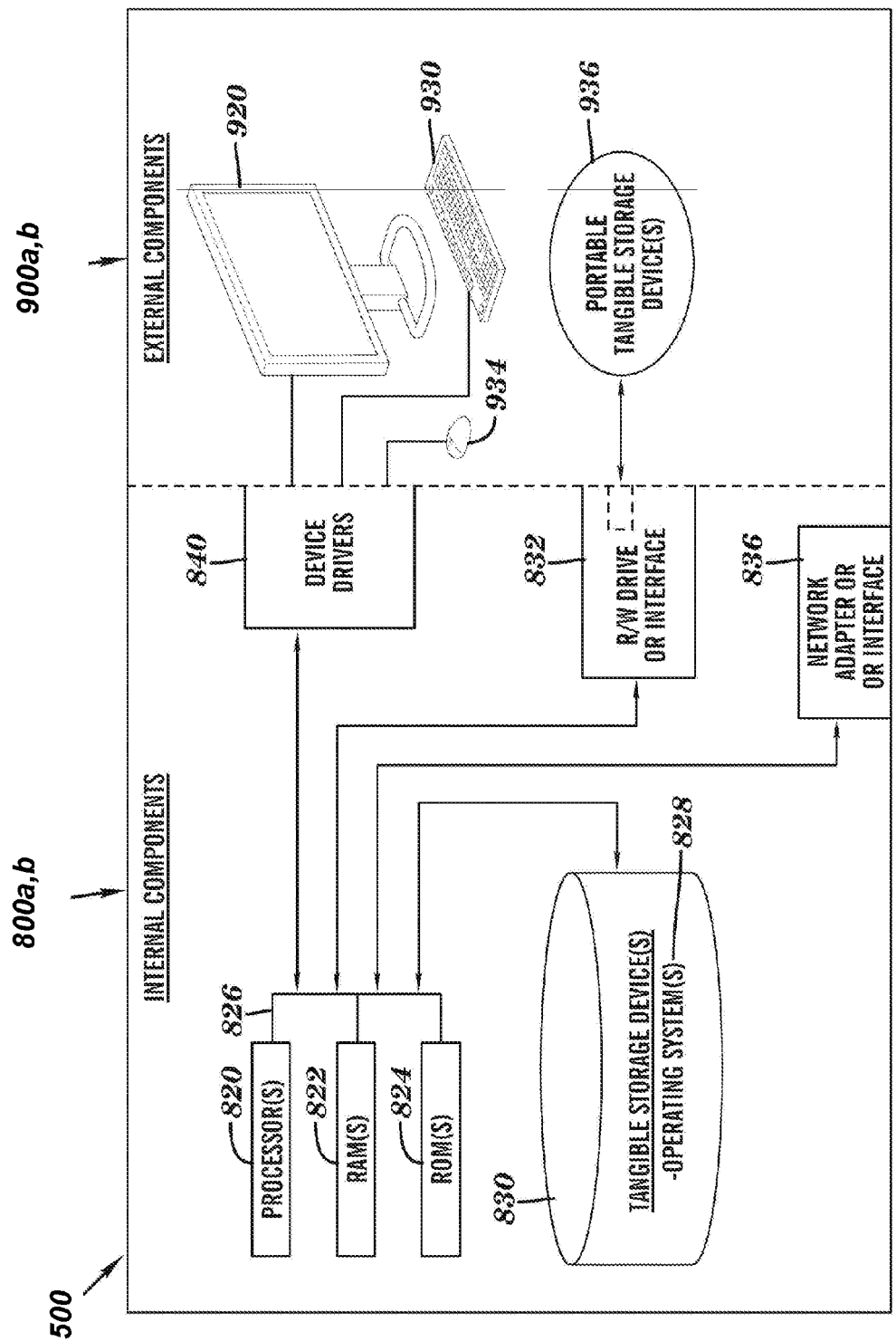
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Client development environment 114A (FIG. 1), and integrated server environment 114B (FIG. 1) may include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs 108 (FIG. 1) in client computer 102 (FIG. 1) is stored on one or more of the respective computer-readable tangible storage medium 830 for execution by one or more of the respective processors 820 via one or more of the respective RAMs 822 (which typically include cache memory). In the embodiment illustrated in FIG. 5, each of the computer-readable tangible storage medium 830 is a magnetic disk storage device of an internal hard drive.

Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108 (FIG. 1), such as client development environment 114A (FIG. 1) can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 (FIG. 1) and client development environment 114A (FIG. 1) in client computer 102 (FIG. 1) and integrated server environment 114B (FIG. 1) can be downloaded to client computer 102 (FIG. 1) and server computer 112 (FIG. 1), respectively from an external computer via a network (for example, the Internet, a local area network or other, wide area network) and respective network adapters or interfaces 836. From the network adapters or interfaces 836, the code software programs 108 (FIG. 1) and client development environment 114A (FIG. 1) in client computer 102 (FIG. 1) and integrated server environment 114B (FIG. 1) in server computer 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for executing a system application test case of a runtime system in an integrated server environment, the computer-implemented method comprising:

establishing, by an integrated server environment, a transmission control protocol connection between a client development environment and the integrated server environment, based on a request, in the client development environment, to initiate execution of the system application test case, the establishing of the transmission control protocol performed in parallel between the client development environment and the integrated server environment;

issuing, by the integrated server environment, a data transfer protocol transmission request to the integrated server environment for a description script of the system application test case, the data transfer protocol transmission request being Hypertext Transfer Protocol;

transmitting, by the integrated server environment, an extensible markup language of the requested description script to the client development environment, via a server component of the integrated server environment;

issuing, by the integrated server environment, a data transfer protocol transmission request to execute the test of system application test case in the integrated server environment, based on the transmitted description script;

executing, by the integrated server environment, the system application test case in the integrated server environment, wherein the server component compiles test results of the executed system application test case in an extensible markup language document; and transmitting, by the integrated server environment, the extensible markup language document of the compiled test results to the client development environment for display, the extensible markup language document comprising a plurality of logs identifying a system application test case condition.

* * * * *